(12) United States Patent
Whittington et al.

(10) Patent No.: US 6,480,839 B1
(45) Date of Patent: Nov. 12, 2002

(54) **SYSTEM AND METHOD FOR IMPROVING DATABASE DATA MANIPULATION USING DIRECT INDEXING WITHIN A B*TREE INDEX HAVING A TUNABLE INDEX ORGANIZATION**

(75) Inventors: Paul Henry Whittington, Idaho Falls, ID (US); Howard Don Stewart, Idaho Falls, ID (US); Kenneth Dale Russell, Idaho Falls, ID (US)

(73) Assignee: Go2market.com, St. Paul, MN (US)

( * ) Notice: Subject to any disclaimer, the term of this patent is extended or adjusted under 35 U.S.C. 154(b) by 196 days.

(21) Appl. No.: 09/618,621

(22) Filed: Jul. 18, 2000

(51) Int. Cl.[7] .............................................. G06F 17/30
(52) U.S. Cl. .............................................. 707/3; 707/2
(58) Field of Search .............................. 707/3, 2, 1, 4, 707/5, 6, 101, 102, 10, 7, 104

(56) References Cited

U.S. PATENT DOCUMENTS

| | | | |
|---|---|---|---|
| 6,175,835 B1 * | 1/2001 | Shadmon ..................... | 707/102 |
| 6,278,992 B1 * | 8/2001 | Curtis et al. ..................... | 707/3 |
| 6,356,890 B1 * | 3/2002 | Agrawal et al. ................ | 707/2 |
| 6,360,215 B1 * | 3/2002 | Judd et al. ...................... | 707/3 |
| 6,366,903 B1 * | 4/2002 | Agrawal et al. ................ | 707/2 |

OTHER PUBLICATIONS

"AdaSAGE Application Development Environment", http://www.adaic.com/docs/flyers/adasage.shtml.

"The AdaSAGE Application Development Environment", http://adaic.org/AdaIC/docs/flyers/text/adasage.txt.

"Conference Announcements: Ada The Language For A Complex World, Call for Participation–European AdaSAGE Tutorials", http://www.cs.kuleuven.ac.be/~dirk/adabelgium/events/95/950530–sage.html.

* cited by examiner

Primary Examiner—Sanjiv Shah
(74) Attorney, Agent, or Firm—Merchant & Gould P.C.

(57) ABSTRACT

A system and method provide multi-threaded database access simultaneous to a plurality of users. One or more searchable indices are created. The searchable indices each have a B*tree having a plurality of nodes arranged hierarchically from a root node. The system and method maintain a known position for a matching query value within the ordered index using the first key count and the one or more second key counts, and search the one or more searchable indices using the first key count and the one or more second key counts. The plurality of nodes have a modify counter for providing an indication of how many times the node has been altered, a number of keys indicator, a first key count and node pointer pair, one or more second key count and node pointer pairs, and one or more keys. The number of one or more keys and the number of one or more second key count and node pointer pairs is equal to the number provided in the number of keys indicator.

19 Claims, 12 Drawing Sheets

SYSTEM AND METHOD FOR IMPROVING DATABASE DATA MANIPULATION USING DIRECT INDEXING WITHIN A B*TREE INDEX HAVING A TUNABLE INDEX ORGANIZATION

TECHNICAL FIELD

The present invention relates to an improved database access and data manipulation system, and more specifically, the present invention relates to improved database data access and data manipulation within a database having one or more B*Tree indices using a tunable index.

BACKGROUND OF THE INVENTION

Web server applications are increasingly being used to provide users with access to data stored in databases over the Internet using web browsers. These web server applications simultaneously respond to incoming user requests by providing a plurality of concurrent threads of execution, each of which responds to an individual request, while maintaining per-user web server application access information. Because of the display limitations of web browsers, the results from such requests may be provided to users as an ordered sequence of pages containing an ordered set of responses.

As a result of this environment, database oriented web server applications are required to logically maintain potentially numerous numbers of large result sets through which a user pages to find the information desired. Typically database systems cannot provide a way to easily index through these large result sets while providing acceptable performance for the plurality of concurrent threads of execution. As a result, current systems are unable to adequately respond to large numbers of simultaneous user requests in which users page through the results.

Part of the problem with such a system is that current databases do not support means to efficiently position at a random location within an index associated with the database and access the data indicated by the index at the desired position. These systems do not easily determine the index position associated with a request or provide efficient access to the data associated with the index position determined; and yet, these operations are quite common when users access databases through a web server application using a web browser. While the traditional methods of positioning within large result sets work adequately when operating in a single thread, or small number of threads, environment, in the large number of threads environment common to web server database applications a new approach to maintaining and indexing databases is needed.

Other database systems may have provided some means to randomly position within an index, and return data associated with the position, more efficiently than is typically done in the name brand RDBMS servers, but none of these solutions is tuned for the large number of threads high read to write ratio environment found on the Internet.

In addition to the inherent shortcomings of current database technology, and the associated performance penalties incurred, the performance problem is further exacerbated by the lack of a high-performance programmatic database interface method. Additionally, current database technology lacks the schema support needed to efficiently maintain per-user web server application access information.

SUMMARY OF THE INVENTION

In accordance with the present invention, the above and other problems are solved by providing a web server-based database access system for providing improved database data access and data manipulation within a database having one or more B*Tree indices using a tunable index.

One aspect of the present invention is a method for providing multi-threaded database access simultaneous to a plurality of users. The method includes creating one or more searchable indices, the searchable indices each comprise a B*Tree having a plurality of nodes arranged hierarchically from a root node, maintaining a known position for a matching query value within the ordered index using the first key count and the one or more second key counts, and searching the one or more searchable indices using the first key count and the one or more second key counts. The plurality of nodes have a modify counter for providing an indication of how many times the node has been altered, a number of keys indicator, a first key count and node pointer pair, one or more second key count and node pointer pairs, and one or more keys. The number of one or more keys and the number of one or more second key count and node pointer pairs is equal to the number provided in the number of keys indicator.

Another aspect of the present invention is a multi-threaded database access system for providing simultaneous access to a database to a plurality of users. the multi-threaded database access system has a user interface module for receiving incoming queries from users and formatting and returning result data to users, a plurality of searchable indices, aquery searching module for locating entries in one or more of the searchable indices satisfying a match condition; and an index modification module for adding, deleting, and modifying entries within the database and corresponding entries in the plurality of searchable indices. The searchable indices each comprise a B*Tree having a plurality of nodes arranged hierarchically from a root node. The plurality of nodes have a modify counter for providing an indication of how many times the node has been altered, a number of keys indicator, a first key count and node pointer pair, one or more second key count and node pointer pairs, and one or more keys. The number of one or more keys and the number of one or more second key count and node pointer pairs is equal to the number provided in the number of keys indicator.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

The great utility of the invention is that the present invention relates to improved database data access and data manipulation within a database having one or more B*Tree indices using a tunable index. These and various other features as well as advantages, which characterize the present invention, will be apparent from a reading of the following detailed description and a review of the associated drawings.

DETAILED DESCRIPTION OF THE INVENTION

Figure 1:
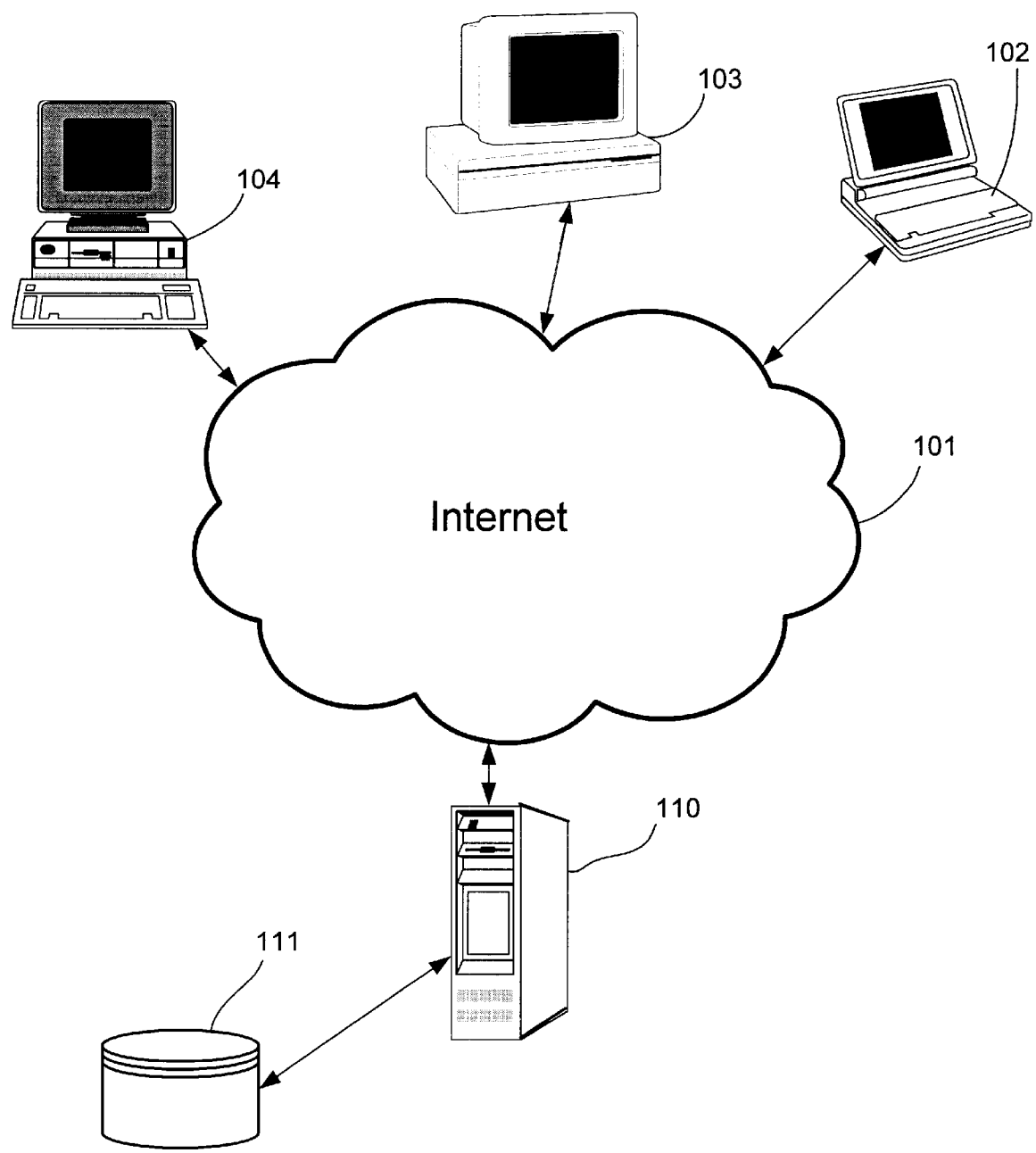
FIG. 1 illustrates an Internet based web server system utilizing an improved database system according to one embodiment of the present invention.

FIG. 1 illustrates an Internet based web server system utilizing an improved database system 100 according to one embodiment of the present invention. In one possible embodiment, the database system 100 includes a web server 110 that accesses data stored on a database mass storage device 111. This database 111 is accessed by one or more users using web browsers executing within their computers 102–104 and communicating with the web server 110 over the Internet 101. In this embodiment, the client 103, for example, uses a web browser to communicate using the http communications protocol to send a URL which includes request information across the Internet 101 to the web server 110. The request information included within the URL typically specifies a database request. The web server 110 processes the URL to obtain the database request information to be supplied to the database 111 resulting in the invocation of the database request specified by the user.

Once the database request is complete, the web server 110 generates the HTML representation for a web page that contains the data corresponding to a result set generated when the database request is applied to the database 111. This HTML representation of the web page is transmitted back across the Internet 101 to the user's computer 103 for display to a user using the web browser. This process of sending a database request, generating the results, generating the HTML web page representation of the results, and returning the representation to the user occurs each time a user using, his or her computer 103, communicates over the Internet to a web server 110 having a database 111.

Figure 2:
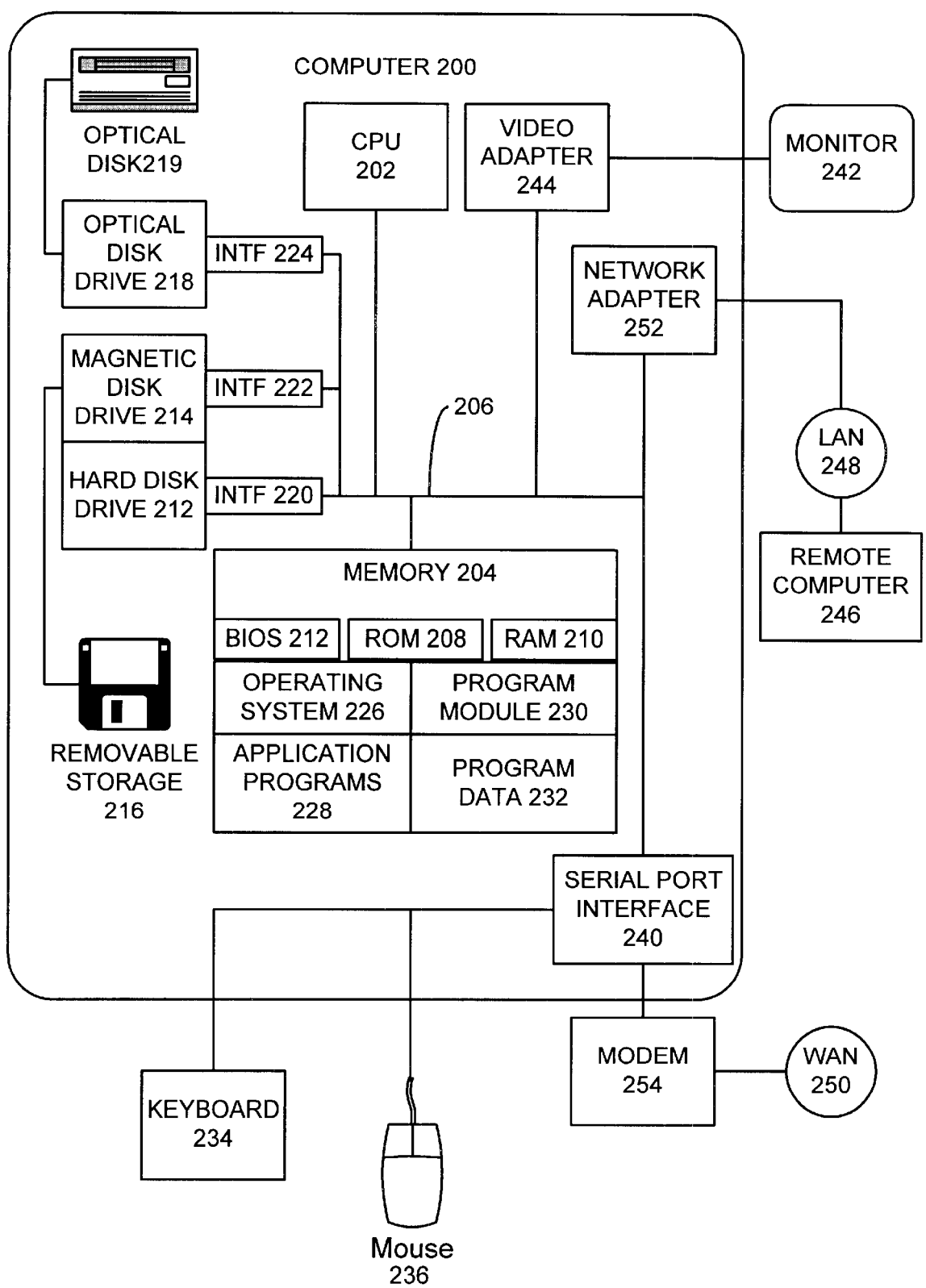
FIG. 2 illustrates a general purpose computing system for use in implementing as one or more computing embodiments of the present invention.

With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), read only memories (ROMs), and various peripheral adaptors that connect to the computer 200 internal bus and provide access to data storage and retrieval capabilities, via any sort of remote connectivity mechanism, that may be physically remote from the computer 200, including, but not limited to, storage area networks (SAN) via fiber optic links, disk arrays via PCI bus extensions, or the storage capabilities of another computer via network communication protocols within a local area network (LAN) or wide area network (WAN).

A number of program modules may be stored on the hard disk, magnetic disk 216, optical disk 219, ROM 208, RAM 210 or functionally equivalent, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these inputdevices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
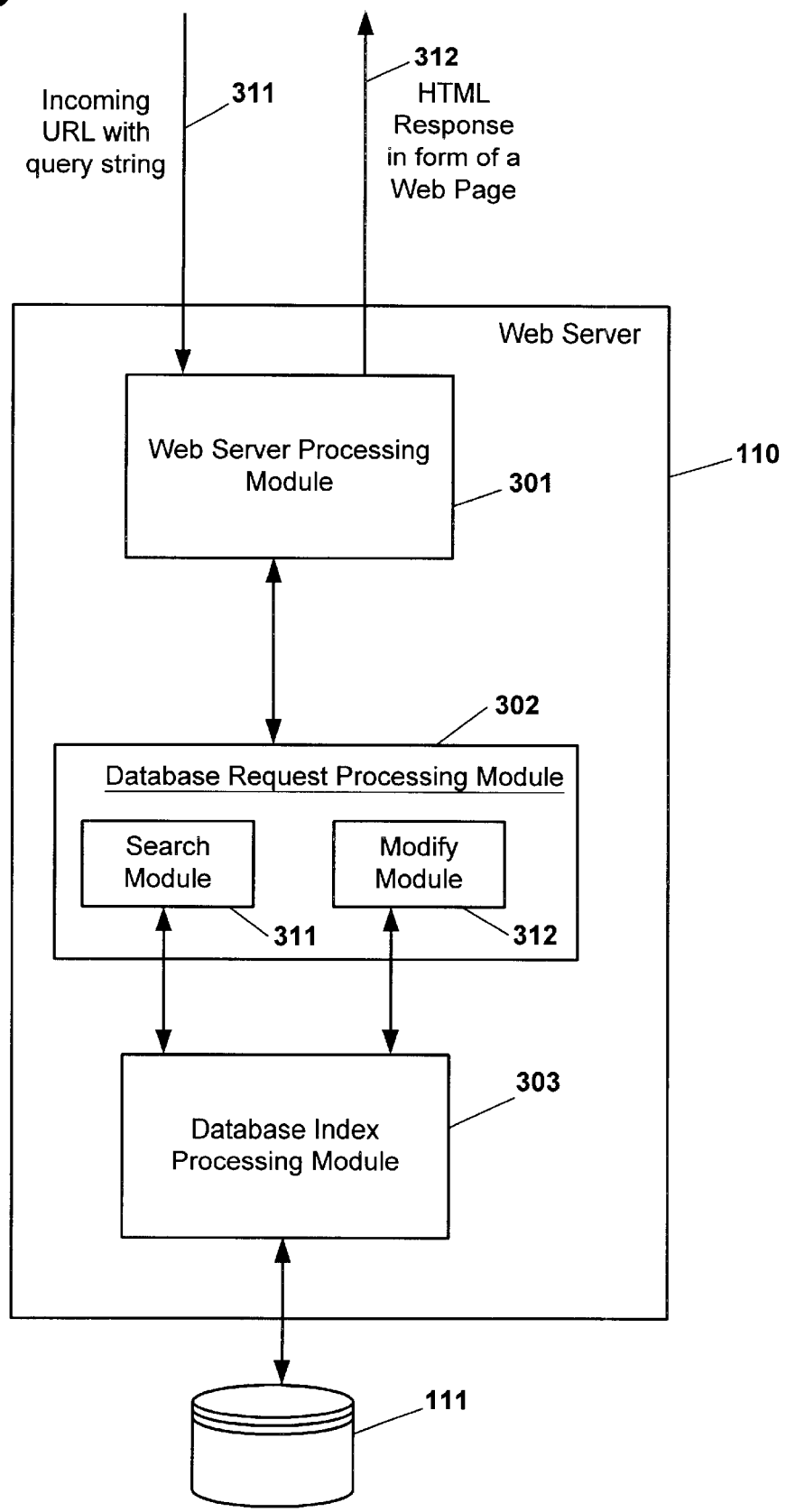
FIG. 3 illustrates a web server computing system including an improved database according to another embodiment of the present invention.

FIG. 3 illustrates a web server computing system including an improved database according to another embodiment of the present invention. The web server 110 includes a plurality of processing modules used to receive database requests from users over the Internet 101 and to generate results that are formatted as HTML and transmitted back to a user. These processing modules may include a web server processing module 301, a database request (update figure name) processing module 302, and a database index processing module 303. The web server processing module 301 receives the HTTP request from a user and performs all the necessary HTTP processing needed to generate a database request that is to be applied to the database system 111. This request is then passed to a database request processing module 302 in which the request is further processed for application against the database 111. A part of this processing of the request may include processing within a database index processing module 303. In the index processing module 303, portions of the request may be applied to the database using previously generated indexes. The indexes organize and arrange the data within fields and database records in some form of a sequential order. This database index processing module 303 retrieves and stores various database records within a database mass storage device 111 as necessary.

Each HTTP request received from a user is processed and has an individual separate request which will be used to generate a response. The web server process simultaneously processes the plurality of such database requests, and thus, the web server processing modules 301–303 operating in a multi-threaded environment permits multiple requests of the database to occur simultaneously. These web server processing modules 310–303 handle all necessary conflict detection and resolution processing to permit the simultaneous reading of the database while the database may also be modified by a write request.

The Database Request Processing module 302 comprises a search module 311 and a modify module 312. The search module 311 performs the processing associated with attempting to locate a request received from a user with data stored within a field in the database. This search module 311 interacts with any B*Tree indices that are used to assist in the searching of the database. Similarly, the modify module 312 processes write requests that alters, adds, and deletes data stored within the database. These changes are also reflected within data entries within any related indices that assist in the searching of the database fields.

Figure 4:
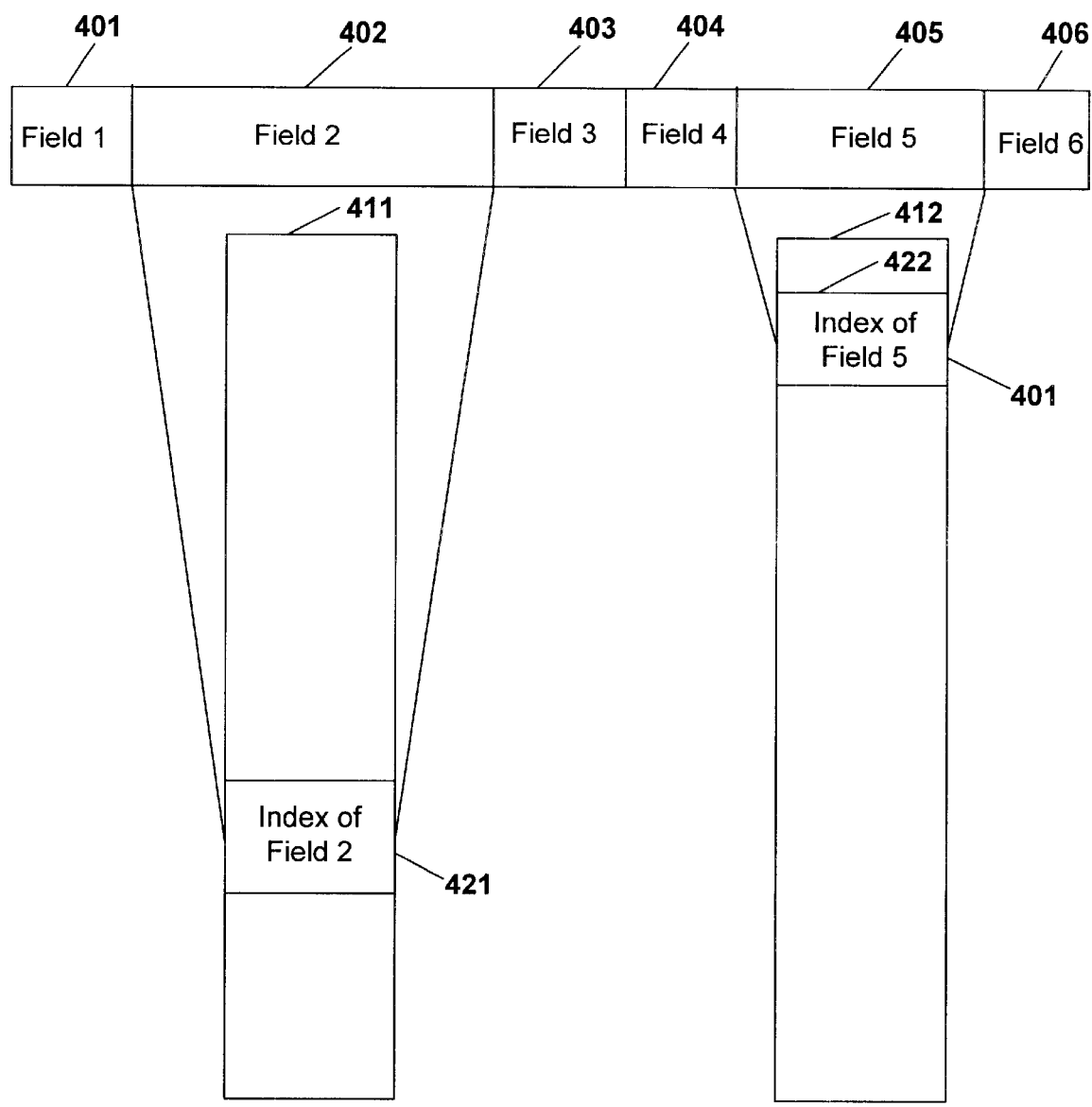
FIG. 4 illustrates a database record included within two indices used in searching the database according to yet another embodiment of the present invention.

FIG. 4 illustrates a database record included within two indices used in searching the database according to yet another embodiment of the present invention. Database engines store the specification of the logical structure of a specific set of stored data, called a database, in what is called a Schema. The specific database structure is specified within the Schema using the concepts of Table, Field and Index. The Schema specifies that the database be composed of one or more Tables. Each Table's specification includes a name, and a specification of the set of data elements, called Fields, that each Row stored within the Table will contain. Fields are specified by a name, and a definition of the characteristics of the data to be stored within that field, called the Field's Type (e.g. Fixed length text, variable length text, whole numbers, floating point numbers, large binary data streams, etc.). By utilizing the specification of the logical structure defined within a Schema the database engine can insure the integrity of the data contained within the database while providing add, modify, delete and search data management services to application programs.

To help the database engine determine the best way to perform the search operations associated with the Tables within a specific database the Schema specifies one or more instances of Index. An Index specifies that one or more fields of a Table will be used to search for a Row within the Table, and as such the database engine should take specific actions to maximize the performance of such a search. For each Row stored within a Table there will be one Index entry associated with that Row in each Index associated with the Table. Additionally, an Index's specification tells the database engine whether or not an entry can be added to the Index that already exists within the Index, thus allowing or disallowing the presence of Rows within the Table that generate a duplicate entry in one of the Indexes associated with a Table. Indexes that allow duplicates are described as Alternate Indexes, while those that don't are described as Primary Indexes.

In FIG. 4, a single row 400 of a database table from a database is shown. The row 400 includes a plurality of fields, Field 1 401–Field 6 406. In addition, two indices, 411–412 are shown. The first index 411 is based upon Field 2 402 of the record. The second index 412 is constructed using Field 5 405. Because Field 2 402 and Field 5 405 contain different data values, the row's location within the respective indices 411–412 may be different.

In addition to the common Tables, Rows, Fields and Indexes, a database Schema according to the present invention allows relationships to be specified between similar Fields in different Tables. In database parlance this is called a Join, or Table Join Relationship. Instead of being specified explicitly within a Schema, as in the present invention, other databases implicitly define these Join relationships within the Schema using Referential Integrity constraints, and within application specific search requests. The problem with the later approach is that these very important relationships between Fields of different Tables are not centrally managed and visible, can not be utilized by development tools to improve the efficiency and reliability of software development activities, and can be very difficult to identify, thus leading to poor application program maintainability characteristics and ultimately poor application program quality.

Figure 5A:
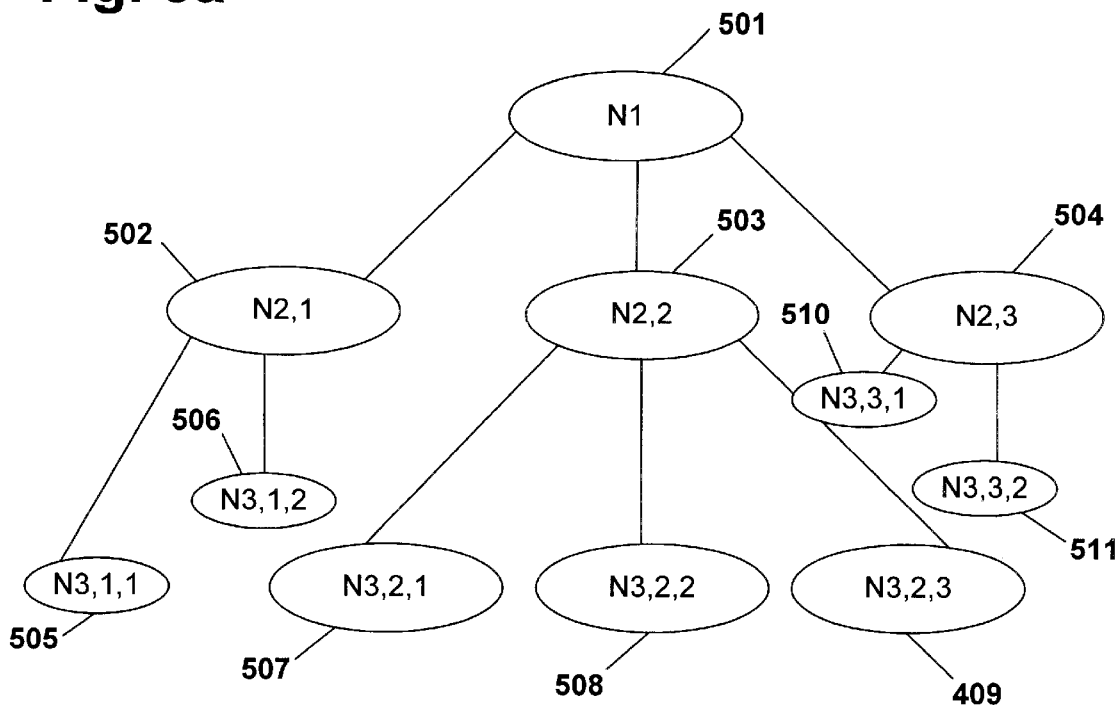
FIG. 5a illustrates a B*Tree used to implement a database index according to one embodiment of the present invention.

FIG. 5a illustrates a B*Tree used to implement a database index according to one embodiment of the present invention. An index tree typically consists of the root node 501 and two or more children nodes 502–504 that descend from a root node 501. In addition, the children are organized such that the left most child 502 represent the lowest value for a key represent by an Index tree. The right most child 504 represents to the highest values for the query value that are represented with the in the index tree. Any children between the left most node 502 and the right most node 504 represent the values for this tree in an increasing an order between the left most node 502 and the right most node 503.

FIG. 5 illustrates a B*tree where any given node typically has up to three children. Two of the nodes 503 and 504 only should show two children each with the remaining nodes being empty. These nodes possess locations at which additional values for the keys to search in the index may be located. In addition, index trees may include any number of children descending from a given node. In such a case where a large number of keys are located within a single node, a search requires a given query value to be compared with a sequence of n keys in the node to find a match. A processing tradeoff related to the amount of memory needed to implement the index tree needs to be compared to the processing required to compare the query value with a given set of keys when constructing a given index tree.

When a search of the index tree occurs, an incoming request value is compared with the keys within node N1 501. If the query value is less than a first key, the processing proceeds to N2,1 502. If the request value is between the first key and a second key, the processing proceeds to the middle node N2, 2 503. Finally if the request value is greater than the second key, the processing continues to node N2, 3 504. Once the processing reaches one of the second level nodes N2, 1–N2, 3 502–504, the process repeats itself for the comparison of the request value with the keys in this second level node. Following this procedure, the processing proceeds to traverse the tree until a leaf node is reached. A leaf node is defined as a node which does not reference any lower level nodes in the index tree. The processing determines that a match has not been found if the request value does not match a key in the leaf node.

Figure 5B:
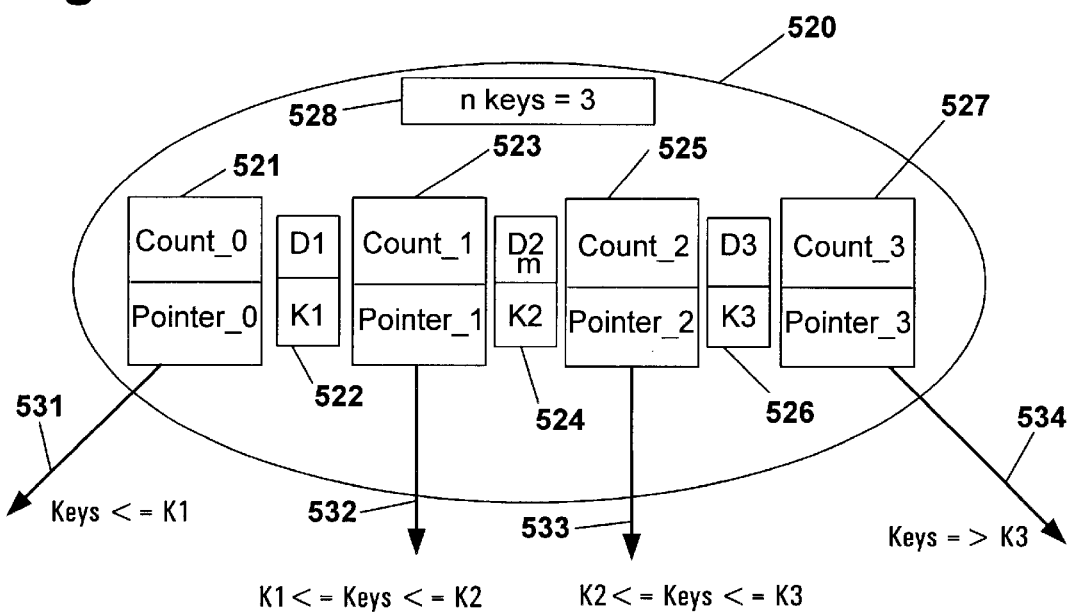
FIG. 5b illustrates a node within a B*Tree used to implement a database index according to another possible embodiment of the present invention.

FIG. 5b illustrates a node within a B*tree used to implement a database index according to another possible embodiment of the present invention. The B*tree is made up of nodes with the following format:

$$n, P0, (K1, D1, P1), (K2, D2, P2) \ldots (Kn, Dn, Pn) \quad (1)$$

where:

n=the number of keys in the node

P0=a pointer to the Btree node with keys less than or equal to $K_i$ $K_i$=the ith key in the node $D_i$=the data associated with the ith key in the node $P_i$=a pointer to the Btree node with keys greater than or equal to $K_i$ All nodes in the tree have the same format and conform to rules that maximize the performance of the B*tree for searching, insertion, and deletion. This format is ideal for situations where a specific key needs to be located quickly, however, in a situation where the nth key in the index needs to be located, or the situation where it is necessary to know the ordinal position of the current key in the index, this node structure is inadequate. The current modifications to the B*tree includes a format to allow for this type of search. The format of a node in this B*tree includes the following format:

$$n, P0, C0, (K1, D1, P1, C1), (K2, D2, P2, C2) \ldots (Kn, Dn, Pn, Cn) \quad (2)$$

where:

n=the number of keys in the node

P0=a pointer to the Btree node with keys less than or equal to $K_0$

C0=the number of keys controlled by the node P0

$K_i$=the ith key in the node $D_i$=the data associated with the ith key in the node $P_i$=a pointer to the Btree node with keys greater than equal to $K_i$ $C_i$=the number of keys controlled by the node $P_i$ With this node structure it is possible to easily and quickly calculate the ordinal position of every key in the B*tree. The $C_i$ counters are automatically updated as keys are inserted and deleted from the tree. This node structure is essentially the same as released previously and works fine in a single threaded environment. In order to make this structure work in a multi-threaded environment, the structures and associated data access and data modification processing extended these structures in the following ways.

The file, tree, and node structures that control access to the respective parts of the B*tree were modified to add critical sections or spin locks to protect access to shared information in these structures. These critical sections allow multiple read threads to be active at the same time and to also allow one active write thread. A write thread includes a thread that adds, modifies or deletes an entry within the database, and thus adds, modifies, or deletes entries within a B*tree. By allowing multiple active threads, the maximum performance is obtained since all read threads are allowed to proceed and all but one write thread are blocked. This is important in an Internet environment where typical access is 95%–99% read and 1%–5% write. Conflicts where the write thread and read threads require the same resources had to be handled to prevent "deadly embrace" situations. A "deadly embrace" occurs when one thread has a resource that another thread needs but is not going to release it until it has the resource it needs, which is being held by the thread needing the resource the first thread needs. In other words, both threads require resources that the other is holding.

Within FIG. 5b, an example of a node that contains three keys, K1 522, K2 524, and K3 526. The node, therefore, possesses four Ci/Pi pairs 521, 523, 525, 527 which connect this node to lower-level nodes 531–534 within the B*tree. When a search of the B*tree occurs, the key from a request is compared with all of the keys within a node. The keys are arranged sequentially such that the key will satisfy one of the four possible conditions corresponding to the links to the lower nodes 531–534. The B*tree is traversed until the key is matched, or until a leaf node in the tree is found. A leaf node is defined when the Pi values are null and do not point to another node. If a leaf node is not found, the key is not matched within the database.

Figure 6:
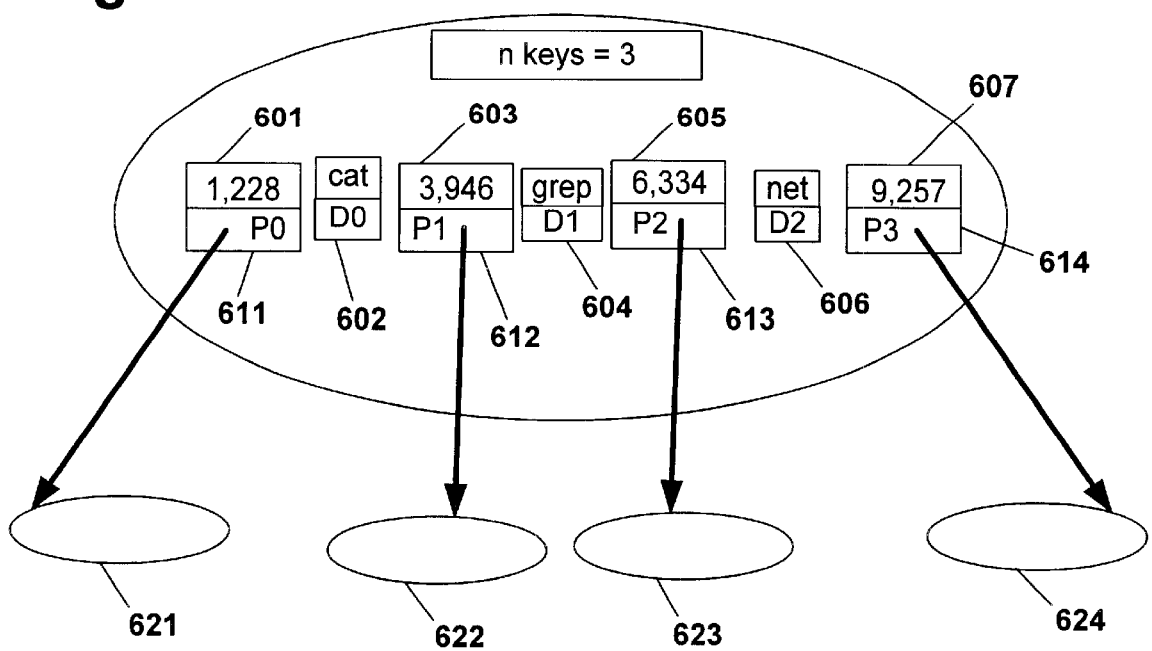
FIG. 6 illustrates a data specific representation of a node within a B*Tree used to implement a database index according to another possible embodiment of the present invention.

FIG. 6 illustrates a data specific representation of a node within a B*tree used to implement a database index according to another possible embodiment of the present invention. Once again, a node is illustrated that contains three keys 602, 604, and 606, and pointers to for lower level nodes 611–614. In this example, the node 600 would likely represent a top-level root node containing keys to an alphabetized list of words. The first key 602 contains the word "cat". All known keys having an alphabetized value less than or equal to "cat" are located within the sub nodes that descend from second level nodes 611. The C0 value states that there are 1228 keys, including "cat", in the nodes controlled by node pointer P0 611. Similarly, the second key 604 has a value of "grep" 604. The C1 value 603 states that there are 3934 keys, including "grep" 604, controlled by the node pointer P1 612. The third key 606 has a value of "net" 606. The corresponding C2 value 605 states that there are 6334 keys, including "net" 606, controlled by the node pointer P2 613. Finally, the C3 value 607 indicates that 9257 keys are controlled by the node pointer P3 613.

The four count values 601, 603, 605, and 607 provides useful information to a search thread as it traverses through an index tree. Because the count $C_i$ always indicates the number of key controlled by a particular key and node pointer, the thread can calculate its current position which in the index at any given time. The thread can immediately return the number of key is less than a query, the number of keys greater than a query, and the number of keys between two query values simply by using these count values appropriately.

More significantly, database queries that are typically performed over the Internet return small subsets of a database, a number typically represents the amount the data will which may be presented to a user in a single screen. When a user wishes to jump through an index, the user needs to scroll or receive all of the values for the index records. When a user wishes for example to move from index value 27 to index value 527, the user would need to scroll through 500 undesired records to reach the record of interest. Because 500 records typically requires numerous many pages to display all of these records, this move operation requires a significant amount of unnecessary processes. Using the count values, the search volume jump directly from record 27 to record 527 with out displaying any other records.

Figure 7:
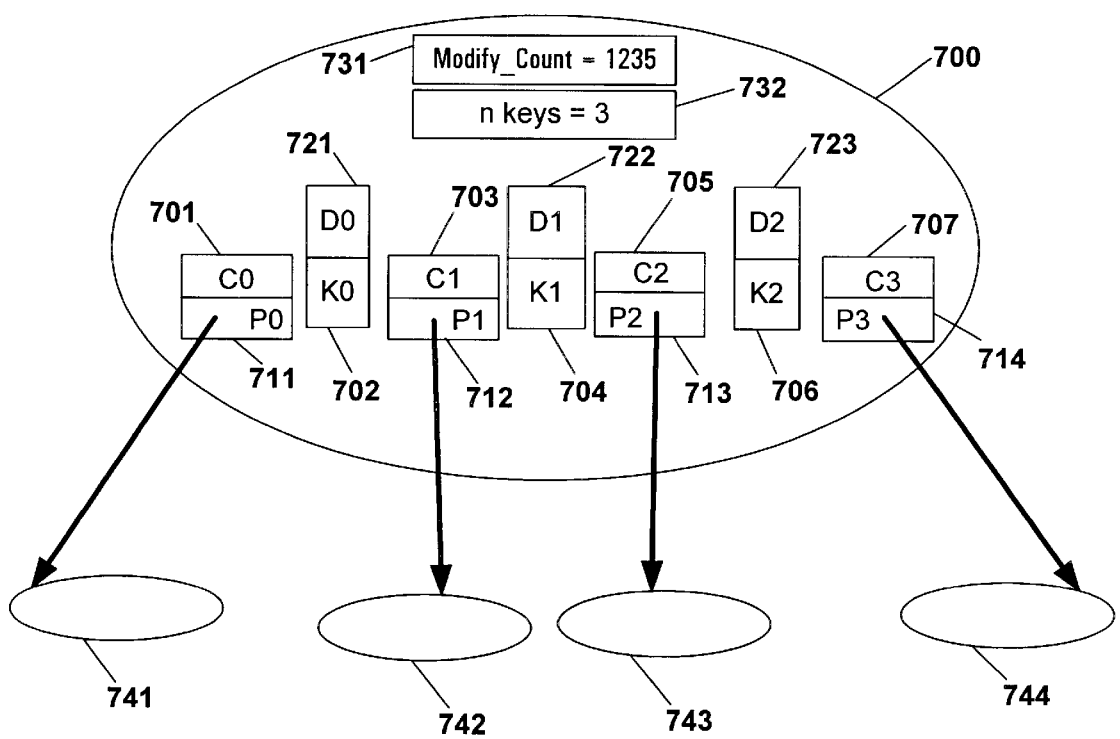
FIG. 7 illustrates a representation of a node within a B*Tree used to implement a database index having a modify counter to detect concurrent changes according to another possible embodiment of the present invention.

FIG. 7 illustrates a representation of a node within a B*tree used to implement a database index having a modify counter to detect concurrent changes according to another possible embodiment of the present invention. Rare cases where the write threads modify resources that change a node structure currently being used by a read thread need to be detected and dealt with in an efficient manner. This is done by modifying the node structure to include a modify counter 731. Each time the node 700 is modified, the modify counter 731 is incremented. When the node 700 is written to disk, the counter 731 is stored with it. This allows the counter 731 to be reset when the node 700 is read back into memory. When a read thread performs a lookup, the modify counter 731 for each node 700 read along the path to the key 702 being located is stored. If the key 702 is not found, then the current node modify counter 731 is compared to the node counter in the search path. If they are different, then the search is retried starting at the node where the count is the same. If the search is retried more than twice, then the write threads are blocked and the read thread is allowed to proceed without interruption.

Figure 8:
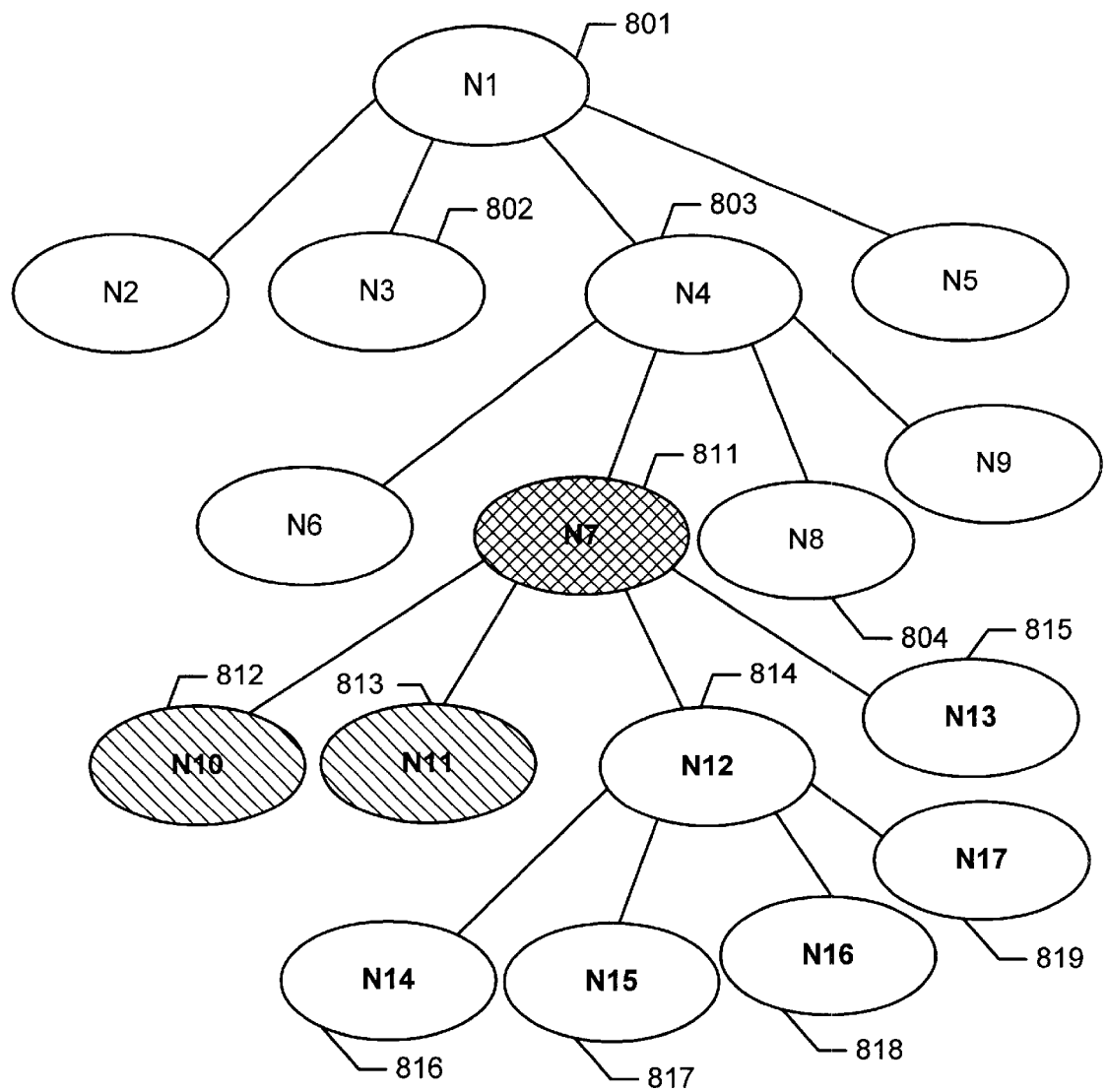
FIG. 8 illustrates a index tree in which a portion of the nodes of the tree have been locked by a write thread to prevent other threads from accessing these nodes according to one embodiment of the present invention.

FIG. 8 illustrates a index tree in which a portion of the nodes of the tree have been locked by a write thread to prevent other threads from accessing these nodes according to one embodiment of the present invention. An update to the $C_i$ node counters 701 provides a top down approach to the updates to the index tree in order to allow the write thread to proceed without blocking all of the read threads. First the update operation determines the position where a new key is to be inserted into or an existing key is to be deleted from the tree. The nodes defining the path from the top of the tree to the target position are then updated to reflect the change. This update is performed by first locking the top node of the tree so that no other thread can access it, then the appropriate counter is modified. Before the lock on the previous node is released, the next node in the chain is locked. This lock prevents read threads from accessing the next node in the chain before it is modified. This process continues until the last node in the chain is reached. FIG. 8 illustrates a subtree starting at N7 811 and its descendants N10 812 through N11 813 in which the nodes of the subtree are locked. Other nodes in the tree may continue to be accessed by other concurrent read threads present in the multi-treaded database access environment.

At this point the requested change, which is either add or delete, is made to this node. The node is then checked to see if it meets the established criteria for the minimum or maximum number of keys in a node. If a limit is exceeded, then the algorithm either balances, or splits a node to bring the node into compliance with the rules. This balancing process requires that the parent node be locked, since either of these operations require modifications to the parent node and possibly the left and right brother nodes. The key is to lock any nodes that might be modified and keep them locked until the modification is complete and it is safe to free the nodes to read threads. Also, this process is an iterative process that may be performed at each node as you move up the tree.

Figure 9A:
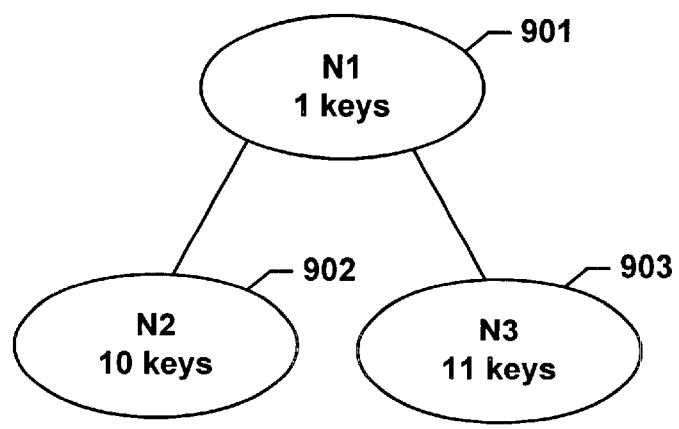
FIGS. 9a–b illustrates the splitting of two nodes into three nodes upon an insertion of a new key into an index tree according to another embodiment of the present invention.
Figure 9B:
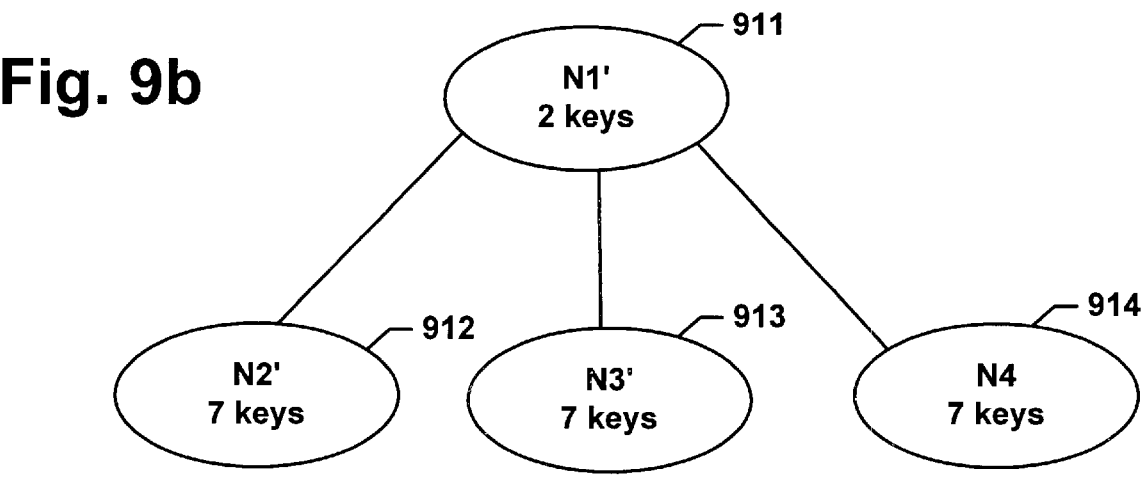

FIGS. 9a–b illustrate the splitting of two nodes into three nodes upon an insertion of a new key into an index tree according to another embodiment of the present invention. FIG. 9a illustrates a subtree of three nodes in which the descendant nodes, N2 902 has 10 keys and N3 903 has 11 keys after the insertion. In this example, ten keys is the maximum number of keys which may be present in any given node. The insertion of a key into the N1–N3 subtree, which is required if the new key's value is between K1 and K10 of N1 901, would require the descendant nodes to be split into three nodes. FIG. 9b illustrates the result of such a division in which the new descendant nodes, N2' 912, N3' 913, and N4 914, each having seven keys and the root node N1 ' 911 having 2 keys. In order to place these keys into the proper descendant node, the set of 22 new keys are arranged into a single ordered list of keys. The first third of the keys are placed into N2' 912. A key is placed in N1 ' 911. The second third of the new keys are placed into N3' 913. Another key is placed into N1' 911 and the remaining keys are placed into the new Node N4 914. Similarly, when a node becomes empty, or becomes less than a certain number of keys, nodes may be combined in a similar manner.

The balancing of nodes insures that node addresses are maintained through the above modifications. For instance, the root address of the tree always remains the same. Whenever two branch nodes are split to create three nodes, as shown in FIG. 9b, the new node, N4 914, is placed in memory so as to insure that active searches are not affected by the new node 914. The previous version used the current left brother node, N2 902, as the base for the new node. These operations are required since a read thread must always be able to count on a node being stable once the address of the node is obtained and before the node is read into memory.

If after a key is inserted it has more than a maximum number of keys allowed in a node, the balancing of nodes processing looks at the nodes adjacent to the current node at the same level in the B*tree. If these adjacent nodes have empty space, the balancing of nodes processing evenly distributes the space across the full, current node and the nodes having empty space. The balancing of nodes processing in a preferred embodiment will look at 2 nodes in either direction at a given level to find empty space before splitting a node into two nodes to create additional empty space in a node.

If after a key is deleted the number of keys remaining in a node is less than half of the maximum number of permitted keys in a node, keys are borrowed from nodes to the adjacent node to either left or right that has the greater number of keys to insure that the current node is at least half full. If both the left adjacent node and the right adjacent node are half full, the balancing of nodes processing combines the three half-filled nodes into two nodes and then deletes the extra node. The root node to the B*tree is the only node permitted to have less than one half of the maximum number of keys permitted in a node.

The balancing of nodes processing permits a user to specify the maximum number of keys, the maximum number of bytes per key, the maximum number of bytes per data value, and the maximum number of nodes to be cached within the physical memory of the computer. In a preferred embodiment, the balancing of nodes processing uses a memory use process to permit an unlimited number of nodes to be cached. This use of an unlimited number of nodes to be cached in the physical memory of the computer significantly improves the speed and performance of the indexing processing on computing systems having large amounts of physical memory. This memory use process uses a hash table to quickly find a node within the memory of the computer and uses a linked list to maintain an indication of the age of nodes if present in physical memory. When a node not present within the physical memory of the computer is accessed, the node needs to be first placed within physical memory.

Figure 10A:
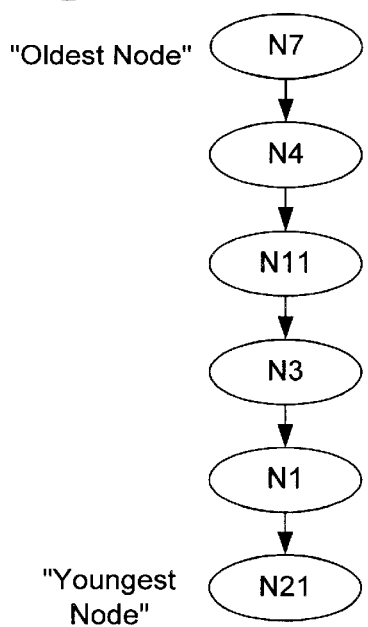
FIGS. 10a–d illustrate the use of a linked list to maintain the age of nodes cached within the physical memory of a computer according to one possible embodiment of the present invention.
Figure 10B:
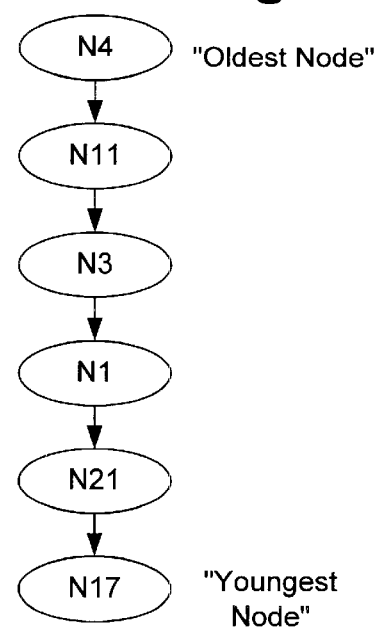

In order to accomplish this operation, another node must first be removed. The node to be removed is chosen as the oldest node on the linked list of nodes as shown in FIG. 10a. This node corresponds to the node residing within physical memory that has not been accessed the longest. Once the oldest node is removed, the new node is added to the young end of the linked list as shown in FIG. 10b.

Figure 10C:
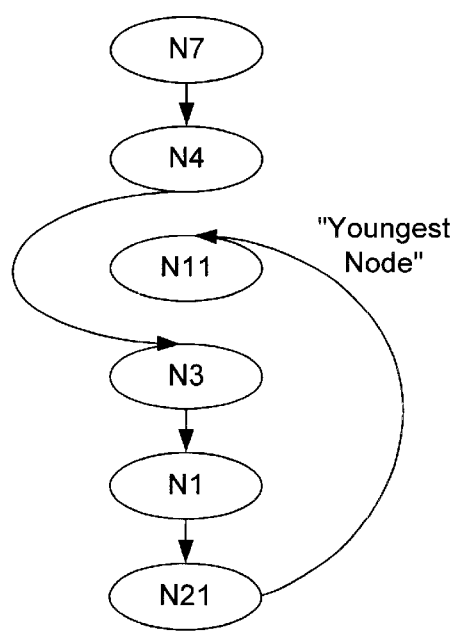
Figure 10D:
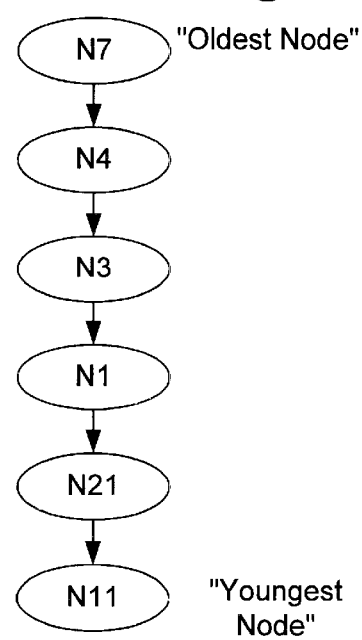

In addition, when any node that is present in physical memory is accessed, its corresponding location within the linked list is moved to the "young" end of the linked list as shown in FIG. 10c. As a result, the nodes at the "young" end of the linked list correspond to the nodes most recently accessed as in FIG. 10d. Correspondingly, the nodes which have not been recently accessed will ultimately move to the "old" end of the linked list. For embodiment of the balancing of nodes processing that utilize a large node cache, this memory use process is critical to maintaining adequate performance.

Figure 11:
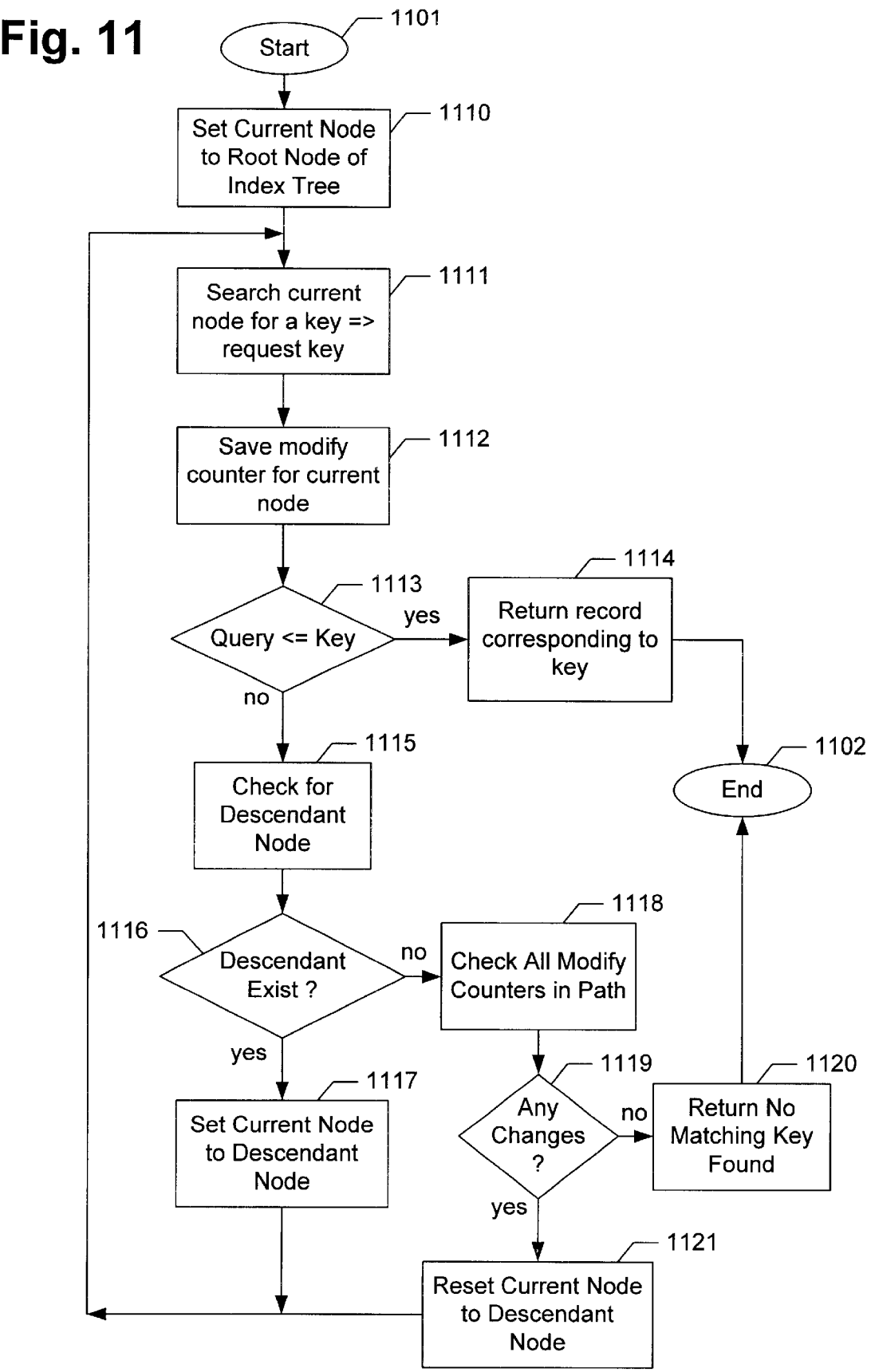
FIG. 11 illustrates an operational flow for the search processing that occurs when a query is applied to an index according to one embodiment of the present invention.

FIG. 11 illustrates an operational flow for the search processing that occurs when a query is applied to an index according to one embodiment of the present invention. The search processing begins 1101 and proceeds to operation 1110 in which the current node to be searched is set to the root node of the index tree. This initialization process begins the search at a root node and proceeds down towards a leaf node. Next, the current node being checked is searched in operation 1111 for a key greater than or equal to the request key. The modify counter for the node is saved in operation 1112.

Processing next compares the incoming request key value with the current key in test operation 1113. If the result of this test 1113 is yes, processing proceeds to operation 1114 where the record corresponding to the key is returned. Once the processing has returned this record, the processing ends 1102.

If test operation 1113 determines that the current key is not equal to the request key value, the processing proceeds to determine if descendant node exists in operation 1115. Test operation 1116 controls the sequence of the processing depending upon the outcome of test operation 1116. If the result of this operation 1116 is true, the current node is set to the descended node in operation 1117 and the processing returns to operation 1111 to continue the iterative process at the descendant node.

Returning to test operation 1116, if the descendent nodes do not exist and thus the result of test operation 1116 is negative, the processing checks all of the saved modify counters in the path to determine if any of the counts have changed. Test operation 1119 determines if any of these counts have changed. If test operation 1119 determines that no changes have occurred, processing returns a result that no matching key was found in operation 1120 and the processing ends 1102. If test operation 1119 finds that changes have occurred in the modify counters, processing resets the current node to the descendant node in operation 1121. Processing then proceeds to operation 1111 to perform the checking for matching keys once again.

Figure 12:
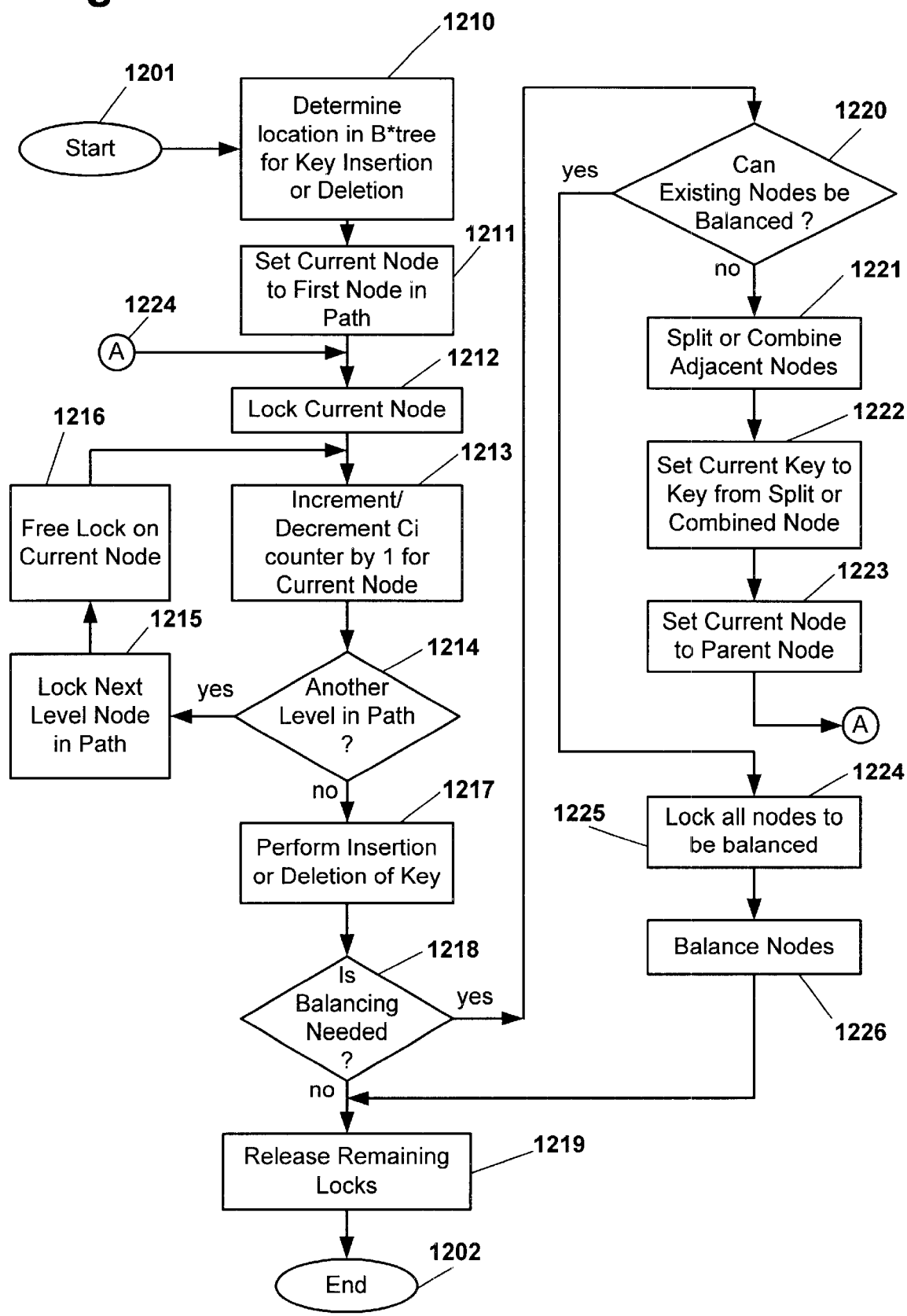
FIG. 12 illustrates an operational flow for the update processing that occurs when a key is inserted, modified and deleted from an index according to one embodiment of the present invention.

FIG. 12 illustrates an operational flow for the update processing that occurs when a key is inserted, modified and deleted from an index according to one embodiment of the present invention. The insertion or deletion processing begins 1201 proceeds to determine the position where a key is to be inserted or deleted into the B*tree in operation 1210. The processing performed is the same for both insertion and deletion operations except for whether a key is added or removed from the B*tree. Once this location is found, the processing sets the current node being processed to the first node in the path from the root node to the node containing the point of insertion or deletion in operation 1211. The current node is locked to provide exclusive use to this insertion and deletion process until the process has been completed its operation 1212. The modify counters in the current node is incremented for an insertion operation or decremented for a deletion operation in operation 1213. Test operation 1214 next determines if another level of nodes in the path from the root node to the point of insertion needs to be updated. If the result of test operation is true, the next level node in the path is locked for exclusive use in operation 1215 and the current node's lock is released in operation 1216 as the next node is set to the current node for additional processing as the operational flow returns to operation 1213 to continue the iterative processing.

Returning to test operation 1214, if the result of the test operation is false, and no more nodes in the path need to be processed, the processing proceeds to perform the insertion or deletion of the key from the node containing the point of insertion in operation 1217. Test operation 1218 next checks to see if the node having the point of insertion or deletion needs to be balanced as discussed above. If test operation 1218 determines that no balancing is needed, the processing releases all remaining locks in operation 1219 and the processing ends 1202.

If test operation 1218 determines that balancing is needed, the processing checks to see if balancing can occur within the existing nodes in a given level of the B*tree in test operation 1220 without needed to split or combine existing nodes. If the result of test operation 1220 is true, the processing locks all nodes needing to be balanced in operation 1225 and the keys within a given level of the B*tree are evenly distributed between the locked nodes in operation 1226. Once the balancing is completed, the processing proceeds to operation 1219 in which all remaining locks are released before the processing ends 1202.

Returning to test operation 1220, if balancing cannot occur without changing the number of nodes in the B*tree, the node containing the point of insertion or deletion is split into multiple nodes in operation 1221. As discussed above, two full nodes are actually split into three partially full nodes if a key is inserted. If a deletion operation is occurring and the node with the point of deletion is less than half full and its adjacent nodes are also half full, three half filled nodes are combined into two partially filled nodes.

Once the new organization of nodes is set in operation 1221, the processing sets the current key to the key from the split or combined node in operation 1222. The processing then sets the current node to the parent node in 1223 and then proceeds to operation 1212 to continue processing of the remaining nodes in the path. In this manner, an insertion or deletion that occurs at a higher level in the path can continue down to the point of insertion. The process continues iteratively until all nodes in the path have been processed.

Thus, the present invention is presently embodied as a method, apparatus, computer storage medium or propagated signal containing a computer program for providing improved database data access and data manipulation within a database having one or more B*tree indices using a tunable index.

While the above embodiments of the present invention describe the use of a database within a web server for providing improved database data access and data manipulation within a database having one or more binary tree indices using a tunable index, one skilled in the are will recognize that the type of improved database data access and data manipulation disclosed and claimed herein may be used in other database operating environments. As long as the B*tree within the database is implemented as disclosed, the present invention to would be useable in any other database environments. It is to be understood that other embodiments may be utilized and operational changes may be made without departing from the scope of the present invention.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing improved database data access and data manipulation within a database having one or more B*tree indices using a tunable index.

What is claimed is:

1. A multi-threaded database access system for providing simultaneous access to a database to a plurality of users, the system comprising:
   a user interface module for receiving incoming queries from users and formatting and returning result data to users;
   a plurality of searchable indices;
   a query searching module for locating entries in one or more of the searchable indices satisfying a match condition;
   an index modification module for adding, deleting, and modifying entries within the database and corresponding entries in the plurality of searchable indices;
   wherein the searchable indices each comprise a B*tree having a plurality of nodes arranged hierarchically from a root node;
   the plurality of nodes comprise:
       a modify counter for providing an indication of how many times the node has been altered;
       a number of keys indicator;
       a first key count and node pointer pair;
       one or more second key count and node pointer pairs; and
       one or more keys and corresponding data;
       the number of one or more keys and the number of one or more second key count and node pointer pairs is equal to the number provided in the number of keys indicator.

2. The system according to claim 1, wherein the first key count and the one or more second key counts contain the number of keys in the searchable index with values less than or equal to the corresponding key.

3. The system according to claim 2, wherein query searching module uses the first key count and the one or more second key counts to maintain a known position for a matching query value within the ordered index.

4. The system according to claim 3, wherein the query searching module locates entries in one or more of the searchable indices satisfying a match condition by traversing the index where a descendant node is searched if the descendent node corresponds to a pointer/counter pair for a key greater than the query value.

5. The system according to claim 4, wherein the query searching module maintains a list of values of the modify counter for nodes as the index is searched;
   the query searching module checks to see if the modify counter values are different from the list of values when no match for a query value is found; and
   if the query searching module determines that the modify counter values are different from the list of values when no match for a query value is found, the search is repeated from a node in which the modify counter has not changed.

6. The system according to claim 2, wherein index modification module uses the first key count and the one or more second key counts to maintain a known position for a matching query value within the ordered index.

7. The system according to claim 6, wherein the index modification module uses node locks to prevent other concurringly executing threads from accessing a node while it is being modified.

8. The system according to claim 7, wherein the index modification module locks all nodes in a path from the root node to the node in which a modification is to occur before a modification is made.

9. The system according to claim 8, wherein the index modification module further increments the modify counter within a given node in the path and unlocks the given node if the given node has a descendant node in the path that is also locked.

10. The system according to claim 9, wherein the index modification module further increments the modify counter within the node in which a modification is to occur, modifies the node, and unlocks the node.

11. The system according to claim 9, wherein the index modification module further determines if the node in which a modification is to occur needs to be balanced as a result of the modification; and if the node needs to be balanced, the index modification module balances the node with all of the other descendant nodes of the node's parent node.

12. A method for providing multi-threaded database access simultaneous to a plurality of users, the method comprising:

creating one or more searchable indices, the searchable indices each comprise a B*tree having a plurality of nodes arranged hierarchically from a root node;

maintaining a known position for a matching query value within the ordered index using the first key count and the one or more second key counts; and searching the one or more searchable indices using the first key count and the one or more second key counts;

wherein the plurality of nodes comprise:

a modify counter for providing an indication of how many times the node has been altered;

a number of keys indicator;

a first key count and node pointer pair;

one or more second key count and node pointer pairs; and one or more keys and corresponding data;

the number of one or more keys and the number of one or more second key count and node pointer pairs is equal to the number provided in the number of keys indicator.

13. The method according to claim 12, wherein the first key count and the one or more second key counts contain the number of keys in the searchable index with values less than or equal to the corresponding key.

14. The method according to claim 13, wherein the searching step further comprises:

locating entries in one or more of the searchable indices satisfying a match condition by traversing the index where a descendant node is searched if the descendent node corresponds to a pointer/counter pair for a key greater than the query value;

maintaining a list of values of the modify counter for nodes as the index is searched;

checking to see if the modify counter values are different from the list of values when no match for a query value is found; and if the query searching module determines that the modify counter values are different from the list of values when no match for a query value is found, repeating the search from a node in which the modify counter has not changed.

15. The method according to claim 13, wherein the method further comprises modifying one or more of the searchable indices.

16. The method according to claim 15, wherein the modifying step further comprises:

locks all nodes in a path from the root node to the node in which a modification is to occur before a modification is made in order to prevent other concurringly executing threads from accessing a node while it is being modified;

incrementing the modify counter within a given node in the path and unlocking the given node if the given node has a descendant node in the path that is also locked;

incrementing the modify counter within the node in which a modification is to occur;

modifying the node in which a modification is to occur; and unlocking the node in which a modification is to occur.

17. The method according to claim 16, wherein the modifying step further comprises:

determining if the node in which a modification is to occur needs to be balanced as a result of the modification; and if the node needs to be balanced, balancing the node with all of the other descendant nodes of the node's parent node.

18. A computer-readable medium having computer-executable instructions for the method recited in claim 17.

19. A computer-readable medium having computer-executable instructions for the method recited in claim 12.

* * * * *